United States Patent [19]

Campbell et al.

[11] Patent Number: 5,655,359
[45] Date of Patent: Aug. 12, 1997

[54] PASSIVE COOLING DEVICE AND METHOD FOR COOLING AN AUXILIARY POWER UNIT ON AN AIRPLANE

[75] Inventors: Thomas A. Campbell, Seattle; David M. Dummeyer, Snohomish; Mohammad Yahyavi, Bellevue, all of Wash.

[73] Assignee: The Boeing Company, Seattle, Wash.

[21] Appl. No.: 441,467

[22] Filed: May 15, 1995

[51] Int. Cl.⁶ .................................. F02C 7/06; F02C 7/14
[52] U.S. Cl. ........................... 60/39.02; 60/39.08; 244/58
[58] Field of Search .................. 60/39.02, 39.08, 60/39.83; 184/6.11, 6.22; 244/53 B, 58

[56] References Cited

U.S. PATENT DOCUMENTS

| | | | |
|---|---|---|---|
| 2,706,255 | 4/1955 | Breaux et al. | 290/4 |
| 4,351,150 | 9/1982 | Schulz | 60/39.83 |
| 4,418,879 | 12/1983 | Vanderleest | 244/53 B |
| 4,934,154 | 6/1990 | Altoz et al. | 62/87 |
| 4,999,994 | 3/1991 | Rud et al. | 60/39.08 |
| 5,265,408 | 11/1993 | Scheoran et al. | 60/39.08 |
| 5,284,012 | 2/1994 | Laborie et al. | 60/39.08 |

*Primary Examiner*—Louis J. Casaregola
*Attorney, Agent, or Firm*—Seed and Berry LLP

[57] ABSTRACT

A passive cooling system for aircraft auxiliary power units having an intake duct extending between an inlet opening and the compartment in which the auxiliary power unit is positioned. An inlet scoop is positioned in the intake duct for diverting a portion of the airflow in the intake duct through an outlet in a wall of the intake duct. A vacuum duct is positioned near an oil cooler for the auxiliary power unit, and an aspirator is operatively positioned between the vacuum duct and an exhaust passage of the auxiliary power unit. The aspirator creates a low-pressure region in the vacuum duct that draws the diverted air out of the outlet and through the oil cooler.

18 Claims, 3 Drawing Sheets

PASSIVE COOLING DEVICE AND METHOD FOR COOLING AN AUXILIARY POWER UNIT ON AN AIRPLANE

TECHNICAL FIELD

The present invention relates to cooling systems for auxiliary power units on airplanes.

BACKGROUND OF THE INVENTION

Large airplanes often have an on-board auxiliary power unit to provide electrical power and compressed air to various systems throughout the airplane. When the airplane is on the ground, the auxiliary power unit is the main source of power to drive the environmental control systems, air driven hydraulic pumps, and the starters for the engines. Auxiliary power units are generally used while the airplane is on the ground, but they may also provide pneumatic and electric power during flight.

Auxiliary power units are lubricated with oil that is cooled by an oil cooler. An active fan is typically used to push air across the oil cooler and through the compartment in which the auxiliary power unit is positioned. Active fans are driven at high speeds by a shaft and complex gear assembly that is operatively connected to the auxiliary power unit. In light of the high operating speeds and numerous, complex mechanical components, active fans may fail over extended periods of use. Active cooling systems Failures have a negative impact on the reliability of auxiliary power units which increase the cost of operating the airplane and raises safety concerns. Accordingly, it would be desirable to provide a cooling system that reduces or eliminates the number of complex, moving mechanical pans.

SUMMARY OF THE INVENTION

The inventive passive cooling system for an auxiliary power unit on an airplane includes an air intake duct extending between an inlet opening on an exterior surface of the airplane and the compartment in which the auxiliary power unit is positioned. The intake duct defines an airflow passage through which the auxiliary power unit its combustion air. An outlet is positioned in a wall of the intake duct, and an inlet scoop is mounted in the intake duct. The inlet scoop has a mouth that is positioned in the air passage upstream from the outlet. The inlet scoop extends within the air passage to a point downstream of the outlet up to the mouth. The inlet scoop diverts air from the intake duct through the outlet to a first side of the oil cooler. A second side of the oil cooler is coupled to a vacuum duct and an aspirator is attached to the vacuum duct. The aspirator uses the exhaust gases to create a low-pressure region in the vacuum duct so that air is drawn from the inlet scoop through the oil cooler and discharged to the exhaust gases.

The method of the invention includes inducing an airflow in an intake duct that extend between an inlet opening in the exterior surface of the airplane and the compartment in which the auxiliary power unit is positioned. A portion of the airflow is then diverted through an inlet scoop mounted in the intake duct to an outlet positioned in a wall of the intake duct. The diverted air exiting the outlet is then drawn through the oil cooler and into a vacuum duct by an aspirator connected to the vacuum duct. The air is then discharged to the atmosphere.

The passive cooling system of the invention operates to cool the oil of the auxiliary power unit while the airplane is either on the ground or in flight. The passive cooling system of the invention also cools and ventilates the compartment to cool the exterior of the auxiliary power unit and to prevent the accumulation of flammable vapors in the compartment.

DETAILED DESCRIPTION OF THE INVENTION

Figure 1:
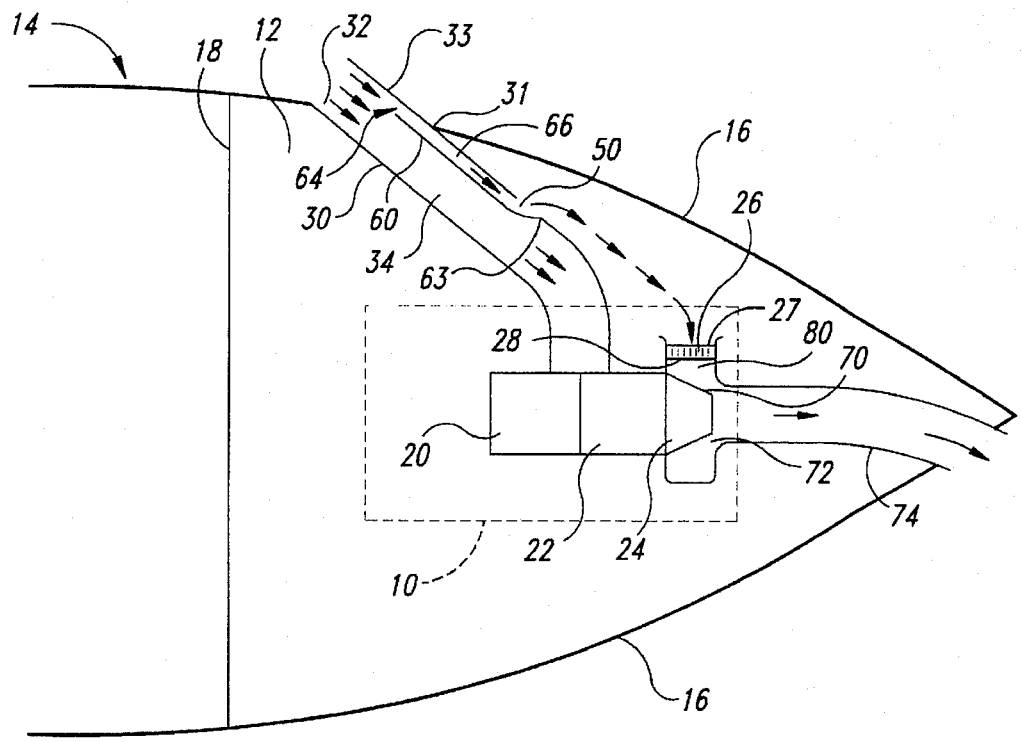
FIG. 1 is a schematic illustration of an embodiment of a passive cooling system in accordance with the invention.

FIG. 1 schematically illustrates an embodiment of a passive cooling system for an auxiliary power unit 10. The auxiliary power unit 10 includes a load compressor 20, a power compressor 22 and a turbine 24. The auxiliary power unit 10 is positioned in a compartment 12, which is located in the aft fuselage of the airplane 14. The compartment 12 is separated from the rest of the fuselage by a firewall 18, and the exterior surfaces 16 of the airplane form the remaining walls of the compartment 12.

An intake duct 30 extends between an intake opening 32 in the exterior surface 16 and the auxiliary power unit 10. The intake duct 30 defines an airflow passage 34 through which the auxiliary power unit 10 draws its combustion air. An inlet door 33 is pivotally attached to the airplane 14 at its trailing edge 31 to open and close the inlet opening 32. When the inlet door 33 is open as shown in FIG. 1, air will flow in the direction of the arrows under the influence of the auxiliary power unit itself (ground operation) or the airstream of the airplane and the auxiliary power unit (flight operation).

An inlet scoop 60 is mounted in the intake duct 30 to divert a portion of the air flowing through the air passage 34 into the compartment 12. The inlet scoop 60 starts to extend outwardly into the air passage 34 from a point 63 downstream from an outlet 50. The scoop 60 then extends upstream through the air passage to its mouth 64. The scoop 60 defines an airflow passage 66 through which a portion of the airflow in the airflow passage 34 is diverted through the outlet 50 and into the compartment 12. In a preferred embodiment, the air is directed from the outlet 50 to a first side 27 of the oil cooler 26.

An aspirator 70 is positioned along the exhaust passage 74 of the turbine 24. A vacuum duct 80 is positioned between the aspirator 70 and a second side 28 of the oil cooler 26. The aspirator 70 creates a low-pressure region in the vacuum duct 80. By positioning the vacuum duct 80 on the second side 28 of the oil cooler 26, the low-pressure region in the vacuum duct assists the scoop 60 in drawing air across the oil cooler 26. In preferred embodiment, the first side 27 is an exterior side of the oil cooler facing the compartment 12 and the second side 28 is an interior side facing the auxiliary power unit 10. The cooling air is then mixed with the exhaust from the auxiliary power unit 10 and expelled into the ambient environment.

FIG. 1 schematically illustrates a preferred embodiment of the invention in which the in intake duct 30 extends through the chamber 12 between the inlet opening 32 and the auxiliary power unit 10. It will be appreciated that in other embodiments of the passive cooling system of the invention, the air intake duct may not extend through the compartment 12. In some embodiments, the compartment 12 may be located fully within the fuselage so that it is not bounded by the exterior surface 16; the intake duct 30 in such embodiments may extend between the intake opening 32 and the compartment 12 without necessarily extending through the compartment. Additionally, the outlet 50 nay be positioned either inside or outside of the compartment 12 depending upon the location of the oil cooler 26 with respect to the compartment.

Figure 2:
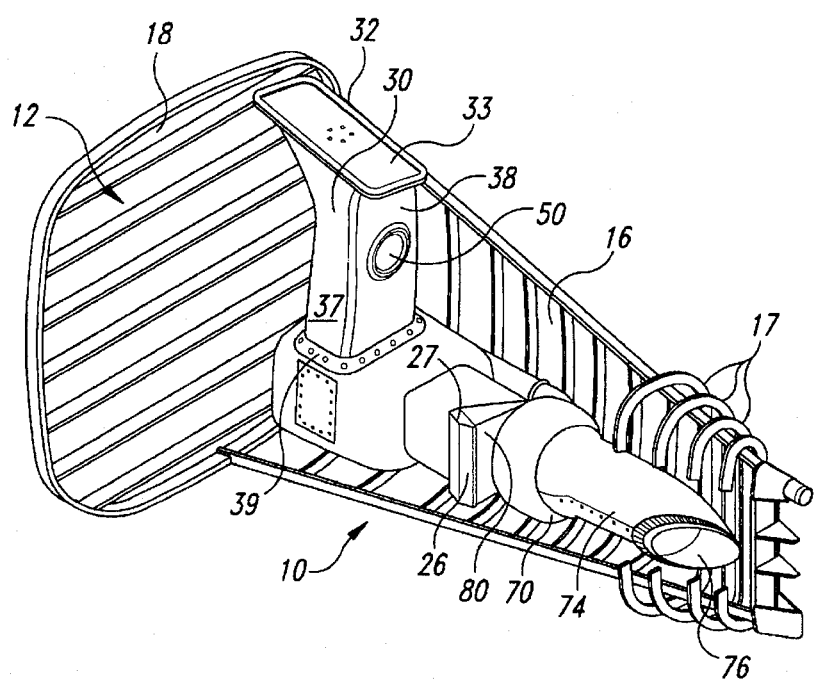
FIG. 2 is a cutaway isometric view of an embodiment of a passive cooling system in accordance with the invention.

FIG. 2 illustrates an embodiment of the passive cooling system in which the compartment 12 is located in the tail cone of the airplane. The intake duct 30 has a sidewall 37 and rearwall 38. A flange 39 is formed on the bottom of the intake duct 30 to attach the intake duct 30 to the top of the auxiliary power unit 10. The outlet 50 is positioned in the rearwall 38 to direct the cooling air into the compartment in the general direction of the exterior side 27 of the oil cooler 26 as shown by the arrow.

Figure 3:
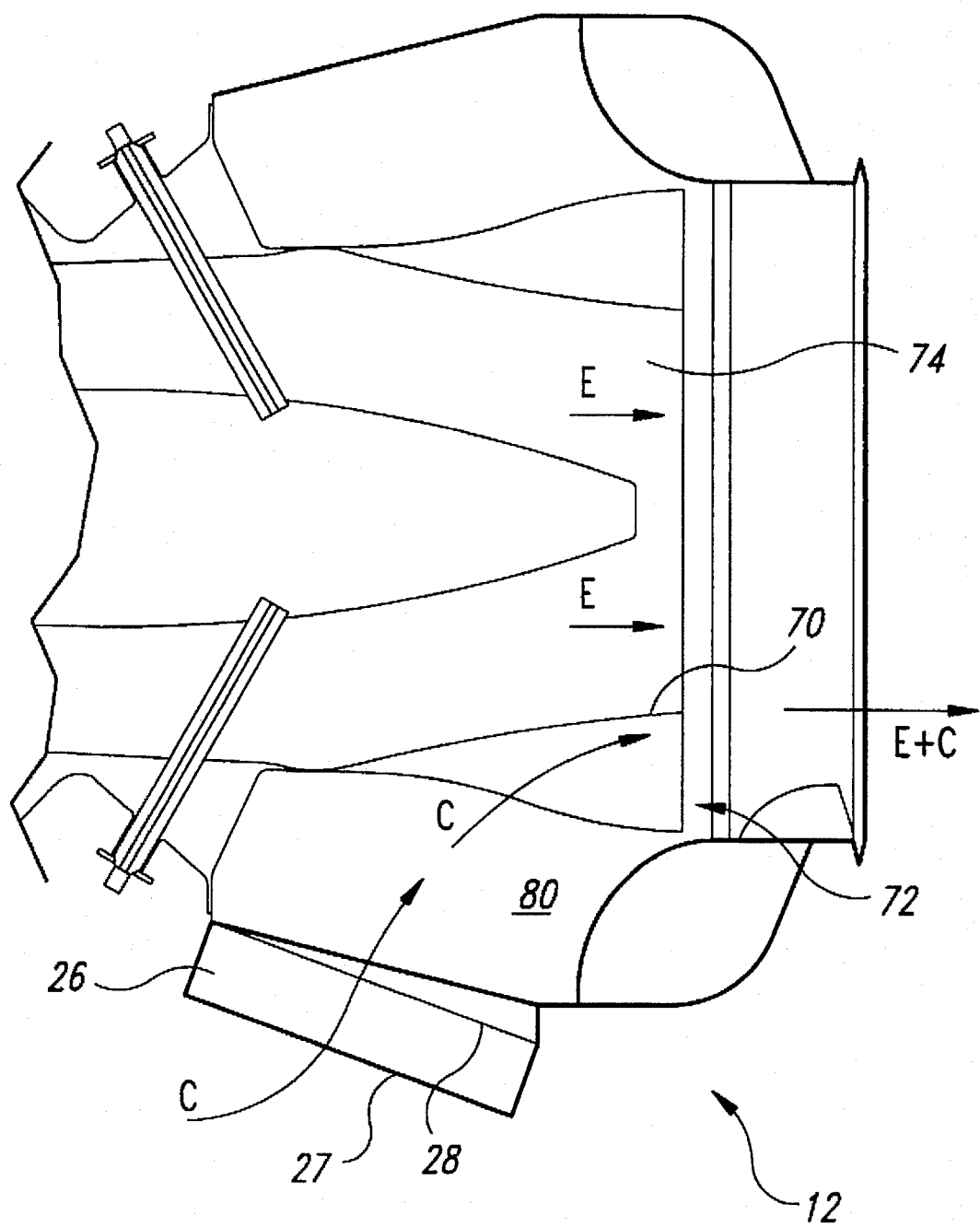
FIG. 3 is a cutaway top view of an aspirator and vacuum duct in accordance with the invention.

The aspirator 70 is preferably a lobed mixer nozzle such as that found on the Allied–Signal 331-500 auxiliary power unit, manufactured by Allied–Signal Aerospace Company. FIG. 3 is a detailed illustration of the lobed nozzle 70 and vacuum duct 80 used on the Allied-Signal 331-500 auxiliary power unit. The exterior side 27 of the oil cooler is exposed to the compartment 12, and the interior side 28 is attached to the vacuum duct 80. A circumferential passage 72 exposes the vacuum duct 80 to the exhaust gas flow (indicated by arrow E). The lobed nozzle 70 controls the mixing contact between the exhaust gases and the air in the vacuum duct 80. The lobed nozzle 70 reduces the diameter of the exhaust passage 74, causing an increase in the velocity of the exhaust gases. As the high velocity exhaust gases exit the lobed nozzle 70, a low-pressure region is created in the vacuum duct 80. The cooling air (indicated by arrow E+C) is drawn through the oil cooler 26 by the lower pressure in the vacuum duct 80 and entrained into the exhaust gases. The cooling air and exhaust gases (indicated by arrow E+C) are then expelled into the atmosphere. The low-pressure region in the vacuum duct also prevents air from recirculating back into the intake duct 30 in the event that the airflow in the air passage 34 creates a low-pressure region at the mouth 64 and attempts to draw air back into the intake duct.

Figure 4:
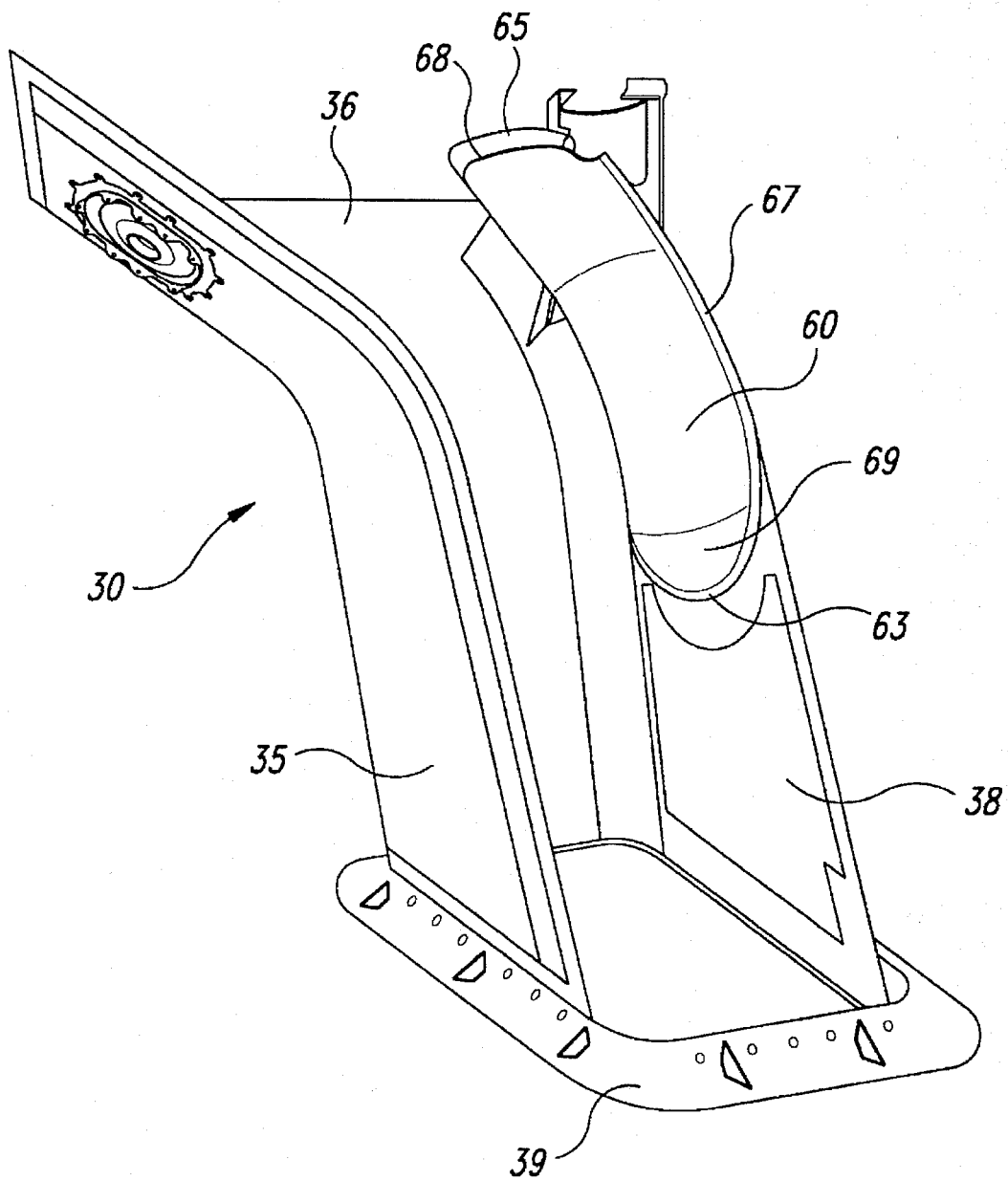
FIG. 4 is a cutaway view of an embodiment of an intake duct and an inlet scoop in accordance with the invention.

FIG. 4 illustrates the intake duct 30 and inlet scoop 60 in greater detail. The intake duct 30 has a frontwall 35 and a sidewall 36 in addition to the rearwall 38 and sidewall 37 shown in FIG. 2. The intake duct 30 is preferably angled to extend rearwardly and downwardly from the inlet opening 32 to the auxiliary power unit 10. The scoop 60 has a semi-elliptical profile for most of its length to enhance the aerodynamic properties of the scoop and prevent disruption of the airflow to the auxiliary power unit. The shape of the scoop 60, however, is not limited to semi-elliptical profiles and other shapes may be used. A perimeter portion 67 of the inlet scoop 60 is attached to the rearwall 38 of the intake duct 30, and a lower portion 69 of the inlet scoop 60 is faired into the perimeter 67 to direct the airflow through the outlet 50. A seal 65 is attached to a lip 68 that defines the mouth 64 of the inlet scoop 60. The seal 65 mates with the bottom surface of the inlet door 33 (not shown) when the door is closed to it air from recirculating from the auxiliary power unit compartment 12 into the air intake duct 30. The seal 65 also prevents flames from entering the intake duct 30 when the inlet door 33 is closed in the event that a fire occurs in the compartment 12. Accordingly, the mouth 64 of the scoop is preferably positioned close to the inlet opening 32 and inlet door 33.

In ground operation, the auxiliary power unit 10 draws airflow into and through the air passage 34. Since the airflow in passage 34 must feed both the auxiliary power unit and he oil cooler 26, the mouth 64 of the scoop 60 must be of sufficient area to feed the oil cooler 26 without starving the main flow to the auxiliary power unit 10. The area of the mouth 64 will vary according to the type of aircraft and auxiliary power unit 10. In the case of a Boeing 777 aircraft using an Allied–Signal 331-500 auxiliary power unit, the mouth 64 has an area of approximately 24 in$^2$. The size of the mouth 64 of the inlet scoop 60 must also be balanced with the amount of vacuum generated by the aspirator 70 to prevent a reverse flow from the compartment 12 into the intake duct 30.

During flight operation, the inlet door 33 opens out into the airstream to induce high-energy ram air into the air passage 34. Because the contour of the body surface of the aircraft converges towards its tail, the pressure at the exit 76 of the exhaust passage 174 is higher than static pressure. The inlet scoop cooling system must overcome this high exit pressure, thus the scoop 60 is preferably positioned on the backwall 38 of the intake duct 30 where the pressure is the highest.

It will also be evident that, although specific embodiments of the invention have been described herein for purposes of illustration, various modifications may be made deviating from the spirit and scope of the invention.

We claim:

1. A passive cooling system for an auxiliary power unit and an oil cooler for the auxiliary power unit on an airplane, comprising:
   a compartment positioned in the airplane, the auxiliary power unit and the oil cooler being positioned in the compartment;
   an air intake duct extending between an inlet opening in an exterior surface of the airplane and the compartment, the intake duct defining an airflow passage through which the auxiliary power unit draws combustion air;
   an outlet in a wall of the intake duct;
   an inlet scoop mounted in the intake duct, the inlet scoop extending into the air passage from a point downstream of the outlet to a mouth positioned in the air passage upstream of the outlet, the inlet scoop diverting air from the intake duct through the outlet to a first side of the oil cooler; and
   an aspirator, the aspirator creating a low-pressure region in a vacuum duct, the vacuum duct being coupled to a second side of the oil cooler so that air is drawn from the inlet scoop through the oil cooler and discharged through a vent.

2. The passive cooling system of claim 1 wherein the intake duct extends through a portion of the compartment to the auxiliary power unit.

3. The passive cooling system of claim 2 wherein the outlet is positioned in the compartment, the inlet scoop diverting the air from the intake duct through the outlet into the compartment and the aspirator drawing the air from the compartment through the oil cooler.

4. The passive cooling system of claim 1 wherein the intake duct includes a rear wall and the inlet scoop is mounted to the rear wall.

5. The passive cooling system of claim 4 wherein the outlet is positioned on the rear wall.

6. The passive cooling system of claim 1 wherein the intake duct has a rear wall and the intake duct extends through a portion of the compartment to the auxiliary power unit, the inlet scoop being mounted to the rear wall and the outlet being positioned on the rear wall in the compartment, the inlet scoop diverting the air from the intake duct through the outlet into he compartment and the aspirator drawing the air from the compartment through the oil cooler.

7. The passive cooling system of claim 1, further comprising an inlet door pivotally to the airplane at the inlet opening, the door being moveable between an open position and closed position for opening and closing the inlet opening.

8. The passive cooling system of claim 7 wherein a seal is positioned on a lip that defines mouth of the inlet scoop, the seal engaging the inlet door in the closed position to air from recirculating from the compartment into the intake duct when the auxiliary power is shut down.

9. A passive cooling system for an auxiliary power unit and an oil cooler coupled to the auxiliary power unit on an airplane, the auxiliary power unit being positioned in a compartment in airplane, the cooling system comprising:

- an air intake duct extending between an inlet opening in an exterior surface of the airplane and the compartment, the intake duct defining an airflow passage through which the auxiliary power unit draws combustion air;
- an outlet in a wall of the intake duct:
- an inlet scoop mounted in the intake duct, the inlet scoop positioned in a portion of the air passage that diverts a portion of the airflow from the air passage through the outlet to a first side of the oil cooler; and
- an aspirator, the aspirator creating a low-pressure region in a vacuum duct, the vacuum duct being coupled to a second side of the oil cooler so that air is drawn from the inlet scoop through the oil cooler and discharged through a vent.

10. The passive cooling system of claim 9 wherein the oil cooler is positioned in the compartment.

11. The passive cooling system of claim 10 wherein the intake duct extends through a portion of the compartment to the auxiliary power unit.

12. The passive cooling system of claim 11 wherein the outlet is positioned in the compartment, the inlet scoop diverting the air from the intake duct through the outlet into the compartment and the aspirator drawing the air from the compartment through the oil cooler.

13. The passive cooling system of claim 10 wherein the intake duct includes a rearwall and the inlet scoop is mounted to the rearwall.

14. The passive cooling system of claim 13 wherein the outlet is positioned on the rearwall.

15. The passive cooling system of claim 10 wherein the intake duct has a rearwall and the intake duct extends through a portion of the compartment to the auxiliary power unit, the inlet coop being mounted to the rearwall and the outlet being positioned on the rearwall in the compartment, the inlet scoop diverting the air from the intake duct through the outlet into the compartment and the aspirator drawing the air from the compartment through the cooler.

16. The passive cooling system of claim 10, further comprising an inlet door pivotally mounted to the airplane at the inlet opening, the door being movable between an open position and closed position for opening and closing the inlet opening.

17. The passive cooling system of claim 16 wherein a seal is positioned on a lip that defines the mouth of the inlet scoop, the seal engaging the inlet door in the closed position to prevent air from recirculating from the compartment into the intake duct when the auxiliary power unit shut down.

18. A method for passively cooling an auxiliary power unit and oil cooler coupled to the auxiliary power unit on an airplane, the method comprising the steps of

- inducing an airflow in an intake duct, the intake duct extending between an inlet opening in an exterior surface of the airplane and a compartment in which the auxiliary power unit is positioned;
- diverting a portion of the airflow in the intake duct through an inlet scoop to the oil cooler, the inlet scoop being mounted in the intake duct in relationship to an outlet in a wall of the intake duct so that the diverted air will flow through the inlet scoop and out of the outlet;
- drawing the diverted air across the oil cooler to a vacuum duct, the vacuum duct being coupled the oil cooler on one side and an aspirator on another side; and
- discharging the air to the atmosphere.

* * * * *

UNITED STATES PATENT AND TRADEMARK OFFICE
CERTIFICATE OF CORRECTION

PATENT NO.    :    5,655,359
DATED         :    August 12, 1997
INVENTORS     :    Campbell et al.

It is certified that errors appear in the above identified patent and that said Letters Patent is hereby corrected as shown below:

In claim 8, column 5, line 12, after "defines" insert -- the --.

In claim 8, column 5, line 13, after "to" insert -- prevent --.

In claim 9, column 5, line 19, after "in" insert -- the --.

In claim 15, column 6, line 9, after "inlet" replace "coop" with -- scoop --.

In claim 17, column 6, line 24, after "unit" insert -- is --.

Signed and Sealed this

Eleventh Day of May, 1999

Attest:

Attesting Officer

Q. TODD DICKINSON

Acting Commissioner of Patents and Trademarks